United States Patent [19]

Numata

[11] Patent Number: 5,588,666
[45] Date of Patent: Dec. 31, 1996

[54] DRIVER SIDE AIR BAG COVER MOUNTING ASSEMBLY

[75] Inventor: Shigeo Numata, Patchogue, N.Y.

[73] Assignee: Izumi Corporation, Yaphank, N.Y.

[21] Appl. No.: 266,250

[22] Filed: Jun. 27, 1994

[51] Int. Cl.⁶ ................................................. B60R 21/16
[52] U.S. Cl. .................. 280/728.2; 280/731; 403/232.1; 403/236
[58] Field of Search ............................ 280/728.1, 728.2, 280/728.3, 731; 403/232.1, 236, 234, 237; 74/552

[56] References Cited

U.S. PATENT DOCUMENTS

| | | | |
|---|---|---|---|
| 4,111,457 | 9/1978 | Kob et al. | 280/728 |
| 4,938,500 | 7/1990 | Nakazato et al. | 280/731 |
| 4,943,027 | 7/1990 | Nakayama | 248/548 |
| 4,989,897 | 2/1991 | Takada | 280/732 |
| 5,062,633 | 11/1991 | Satoh | 280/731 |
| 5,064,217 | 11/1991 | Shiraki | 280/731 |
| 5,092,627 | 3/1992 | Igawa | 280/728 |
| 5,118,133 | 6/1992 | Zushi et al. | 280/728 A |
| 5,141,247 | 8/1992 | Barth | 280/728 |
| 5,356,173 | 10/1994 | Hongou et al. | 280/728 A |

FOREIGN PATENT DOCUMENTS

| 6016102 | 1/1994 | Japan | 280/728 A |
|---|---|---|---|

Primary Examiner—Paul N. Dickson
Attorney, Agent, or Firm—Stephen E. Feldman

[57] ABSTRACT

A mounting arrangement for a vehicle air bag comprises, basically, a boss, a base plate, attachment clips and fasteners. The boss is affixed to a component of the vehicle, the base plate has a first mounting portion on which the air bag is mounted and a second mounting portion to which the boss is attached. The fasteners connect the attachment clips to the second mounting portion of the base plate and the boss. Each of the clips have generally straight leg sections, and a central section connecting the leg sections together. The leg sections have an end portion, and each of the end portions has an aperture therethrough for receiving one of the fasteners, and for attaching together the second mounting portion and the boss.

4 Claims, 4 Drawing Sheets

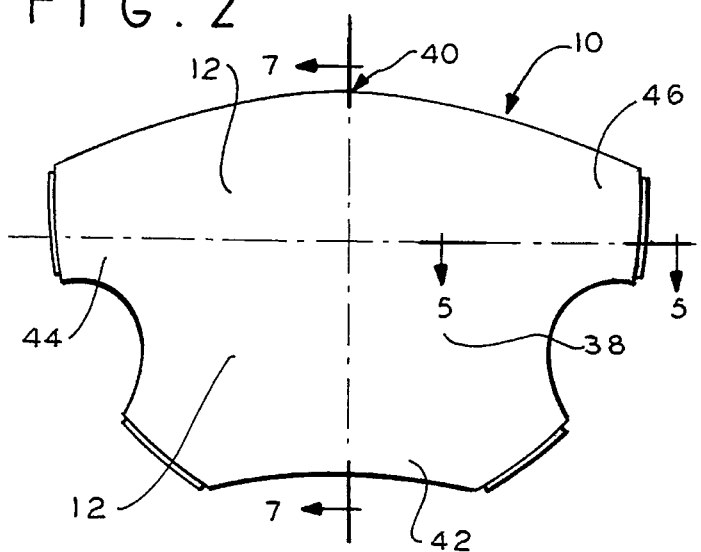
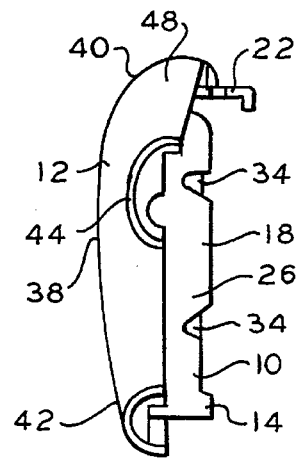
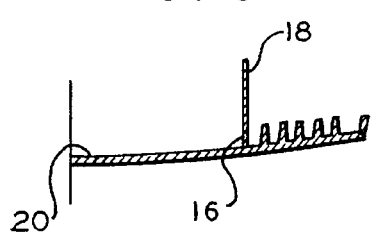
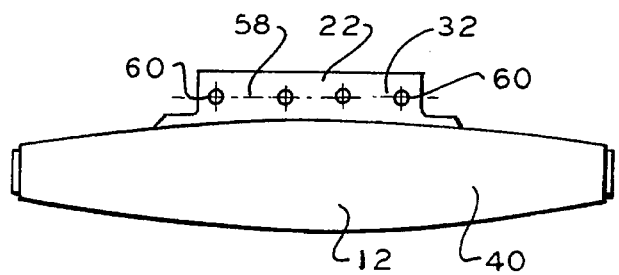
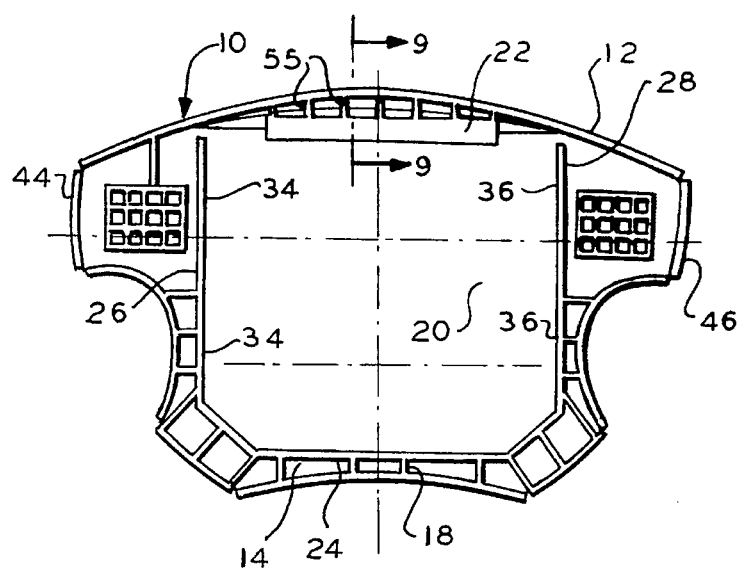
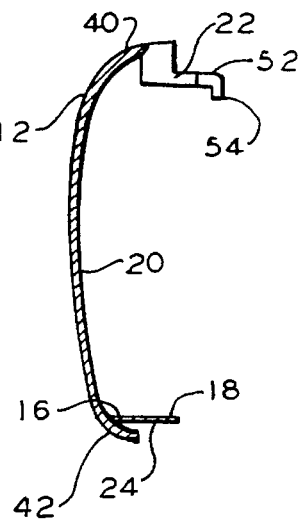

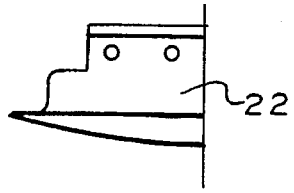
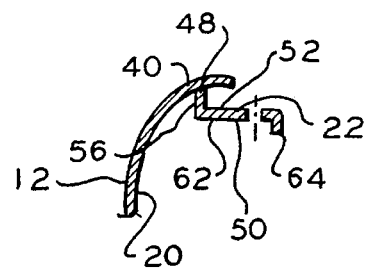
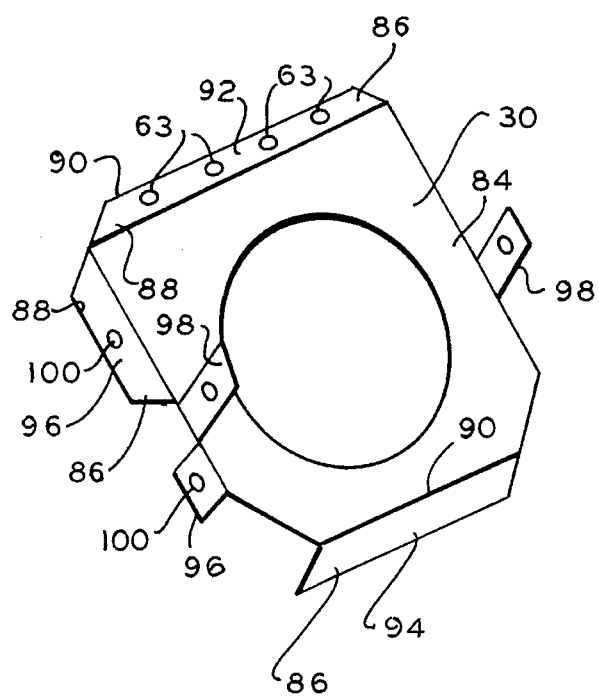
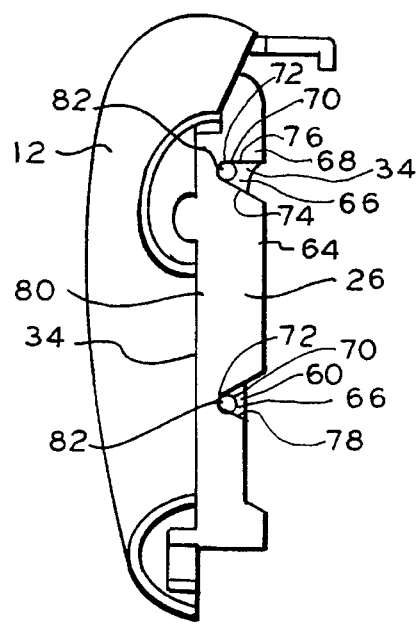

DRIVER SIDE AIR BAG COVER MOUNTING ASSEMBLY

FIELD OF THE INVENTION

The present invention relates to a mounting assembly for an air bag cover disposed on the hub of a steering wheel used in automobiles.

PRIOR ART

In order to reduce personal injuries from most types of automobile accidents, seat belts were installed in passenger vehicles for individuals driving and riding in the vehicle.

To provide additional occupant protection, inflatable air bags were also installed in such passenger vehicles, to protect the driver and passenger in the front seat. An air bag would be disposed in the hub of the steering wheel to protect the driver and another air bag would be disposed in the instrument panel, in front of the-front seat passenger, to protect this passenger. When an accident occurs during driving, a release mechanism is activated by the impact of the vehicle, the folded air bag in the steering wheel and the folded air bag in the instrument panel are inflated rapidly. The people in the front seat of the vehicle, who are thrown forward by the sudden declaration of the vehicle, are caught by these inflated air bags, before they impact against any hard objects or sharp edges, and especially before they hit the windshield of the vehicle. The inflation of the folded air bag can be effected in a conventional manner by a gas container or generator. Air bags which are automatically inflated during accidents have the advantage, compared to safety belts alone, in that the latter are only activated by specific actions taken on the part of the occupants in the vehicle, i.e. properly positioning and locking the seat belts. In contrast, air bags are kept ready to immediately function independent of such actions, and they do not inhibit freedom of movement of the occupants in the vehicle.

In the prior art, an air bag cover assembly was mounted on the steering wheel using mounts or clips made by aluminum die-casting which are secured to the spokes connecting the boss plate. Such aluminum mounts had to be secured to the spokes by welding and accordingly the installation of such an air bag cover assembly to the spokes was a difficult task.

Another air bag mounting system for vehicles utilized spoke members of a steering wheel, which spokes were integrally formed with the boss plate at their inner ends. Such a steering wheel comprises an outer wheel member, a boss plate arranged in a central hollow space of the wheel member, and a plurality of spoke members connecting the wheel member and the boss plate. The boss plate and the spoke members are provided with continuous flange portions along either edges. The boss plate is further provided with side flanges, each disposed between base portions of a pair of adjoining spoke members and each extending along one lateral edge of the boss plate. Each of the side flanges has a width larger than that of the other flanges and bent behind the major plane of the boss plate with an angle, preferably a half of the right angle, with respect to the major plane of the boss plate, to constitute means for securing air bag unit. Such an air bag mounting system is disclosed by Nakazato et al. in U.S. Pat. No. 4,938,500.

Another device comprises an inflatable air bag, an inflator for inflating the air bag and a support plate or supporting the inflator and the air bag in a vehicle. It further comprises means for clamping the air bag and the inflator to the support plate. The clamping means comprise clamping element which are bent into positions for clamping the air bag, the inflator, and the support plate together. In one embodiment, the clamping means comprise a retainer member having a ring shaped base portion and a circular retainer flange extending radially from the base portion. The retainer member further comprise two groups of tabs extending from the base portion. The first group of tabs extends radially inwardly of the retainer flange. Those tabs support one side of a flange on the inflator. Individual tabs of the second group extend radially inward to clamp the inflator flange against the first group of tabs. Other individual tabs of the second group extend radially outward to clamp the air bag between the support plate and the retainer flange. The retainer member thus secures the air bag, the inflator, and the support plate together. Such a device is disclosed by Barth in U.S. Pat. No. 5,141,247.

A still further mounting arrangement for a vehicle air bag comprises a mounting bracket affixed to a component of the vehicle, a base plate having a mounting portion on which an air bag and an inflator are mounted, and a plurality of fasteners connecting the base plate to the bracket. Plastically deformable structures are associated with the fasteners and the base plate is arranged such that the mounting portion of the base plate is displaceable in a direction away from the mounting bracket in response to the forces imposed on the base plate at the end of the development of the air bag.

The deformable structure may be portions of the base plate located proximate to the fasteners and located and dimensioned to deform plastically. In one form of such an arrangement said portions of the base plate are mounting tabs oriented generally parallel to the direction of said forces, each tab has a hole receiving a fastener, and a portion of each tab between the fastener and the mounting portion of the base plate has holes defining plastically deformable segments of the tab that elongate in response to said forces. In a similar arrangement a portion of each tab between the fastener and the distal end has an opening into which deformable protrusions project, the protrusions being engageable and deformable by the fastener.

The deformable structure may be attachment clips having initially bent leg portions, the clips being fastened by welding, between the bracket and the mounting plate and the leg portions being plastically deformable to reduce or eliminate the bends in response to said forces.

In another arrangement the base plate has holes for the fasteners located in portions lying generally orthogonally to the direction of said forces, and there are slits in the base plate on opposite sides of each hole that define plastically extensible segments of the base plate. Such a mounting arrangement is disclosed by Nakayama in U.S. Pat. No. 4,943,027.

SUMMARY OF THE INVENTION

The present invention relates to a mounting assembly for a driver side air bag cover assembly used in a vehicle.

The mounting arrangement for a vehicle air bag, in its broadest aspect, comprises essentially a boss means, a base plate, attachment clips and fasteners. The boss means is affixed to a component of the vehicle, the base plate has a first mounting portion on which the air bag is mounted and a second mounting portion to which the boss means is attached. The fasteners connect the attachment clips to the second mounting portion of the base plate and the boss means. Each of the clips have generally straight leg sections, and a central section connecting the leg sections together. The leg sections have an end portion and each of the end portions has an aperture therethrough for receiving one of the fasteners and for attaching together the second mounting portion and the boss means.

The mounting arrangement for a vehicle air bag, in its narrowest aspect, comprises essentially a boss means, a base plate, attachment clips and fasteners. The boss means is affixed to a component of the vehicle, the spoke means extend from the boss means, and the base plate has a first mounting portion on which an air bag is mounted and a second mounting portion to which the boss means is attached. The fasteners have a shank portion and the fasteners connect the attachment clips to the second mounting portion of the base plate and the boss means. Each of the clips have generally straight, flexible, and non-deformable leg sections and a central section connecting said leg sections together. Each of the leg sections has an end portion and each of said end portions have an aperture therethrough for receiving the shank portion of one of said plurality of fasteners and for attaching together said second mounting portion and said boss means. The boss means, said second mounting portion, said attachment clips, are formed of magnesium, aluminum and steel materials, respectively. The attachment clips are spaced apart from said spoke means and said boss means mounting portions are spaced apart from said spoke means. The boss means mounting portions are disposed generally perpendicular to said base plate and each boss means' mounting portions have a slot formed on opposite sides thereof. Each of said attachment clips frictionally engage one of the sot formed in said boss means' mounting portion and one side of the base plate's mounting portion. Each of said slots are tapered in opposite directions and extending along the entire height of the boss means' portions. A channel extends between the slots formed on opposite sides of each of the boss means' portions.

Accordingly, an object of the invention, is to provide an improved driver side air bag cover mounting arrangement.

Another object of the present invention, is to provide an improved driver side air bag cover mounting arrangement which permits the air bag cover assembly to be easily attached to the steering wheel.

A still further object of the present invention, is to provide a driver side air bag cover mounting arrangement which obviates the use of welding.

Other objects, features and advantages of the present invention will become apparent from the subsequent description and the appended claims taken in conjunction with the accompanying drawings.

BRIEF DESCRIPTION OF THE DRAWINGS

FIG. 2 is a front plan view of the cover for an air bag in accordance with the present invention;

FIG. 3 is a right side view of the cover shown in FIG. 2;

FIG. 4 is a top plan view of the cover shown in FIG. 2;

FIG. 5 is a sectional view taken along line 5—5 of FIG. 2;

FIG. 6 is a bottom top plan view of the cover shown in FIG. 2;

FIG. 7 is a sectional view taken along line 7—7 of FIG. 2;

FIG. 8 is a rear plan view of half of the upper member of the cover shown in FIG. 6;

FIG. 9 is a sectional view of the upper member and a section of the lid portion attached thereto taken along line 9—9 of FIG. 6;

FIG. 10 is an enlarged right side view of the cover shown in FIG. 2;

FIG. 11 is a perspective view of the base plate which is connected to the underside of the cover shown in FIG. 6.

DETAILED DESCRIPTION OF THE PREFERRED EMBODIMENT

Figure 1:
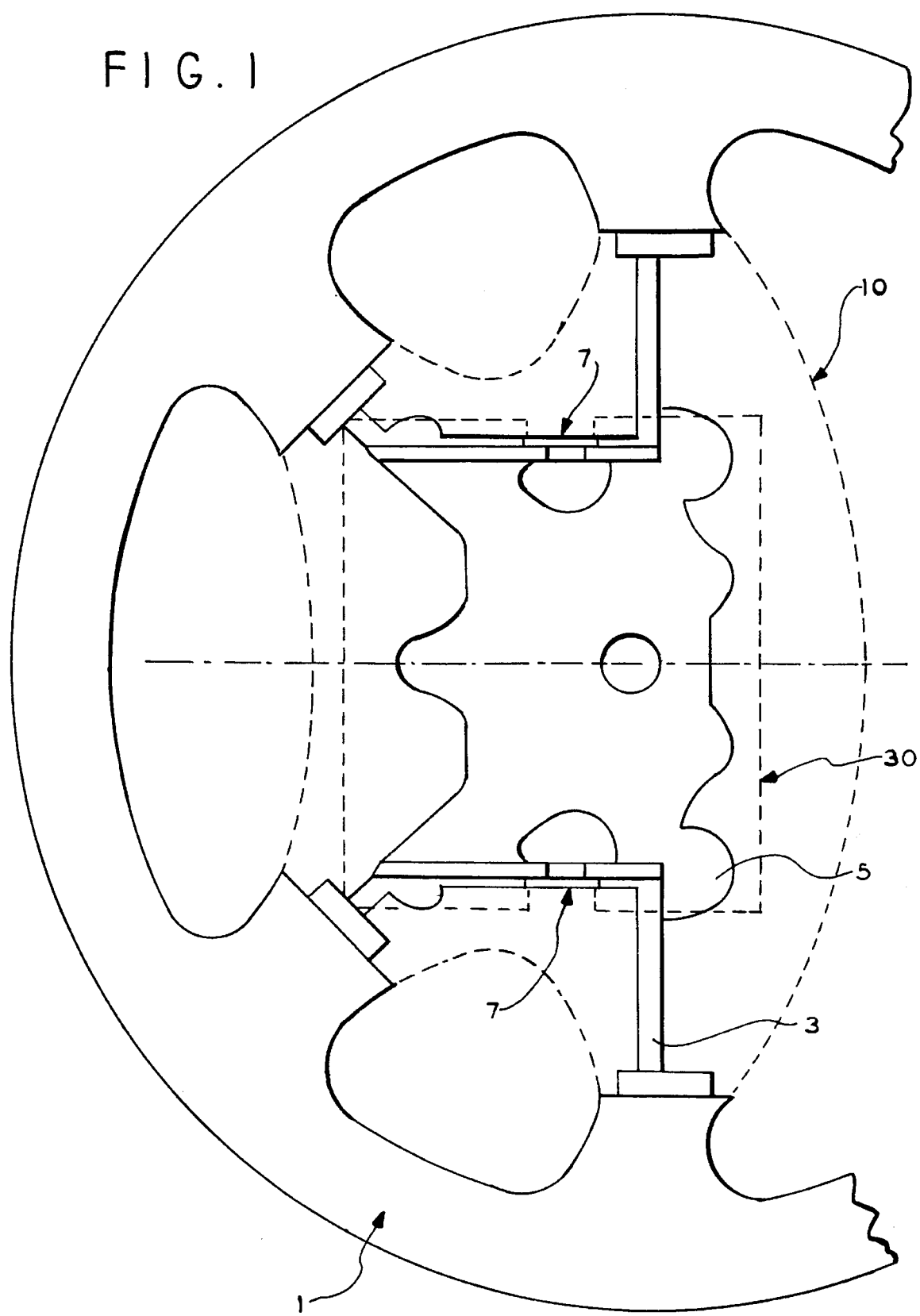
FIG. 1 is a front plan view, partly broken away, of a steering wheel assembly, and an air bag cover assembly shown in dotted lines, all of which are adapted for mounting an air bag unit, according to the present invention.
Figure 12:
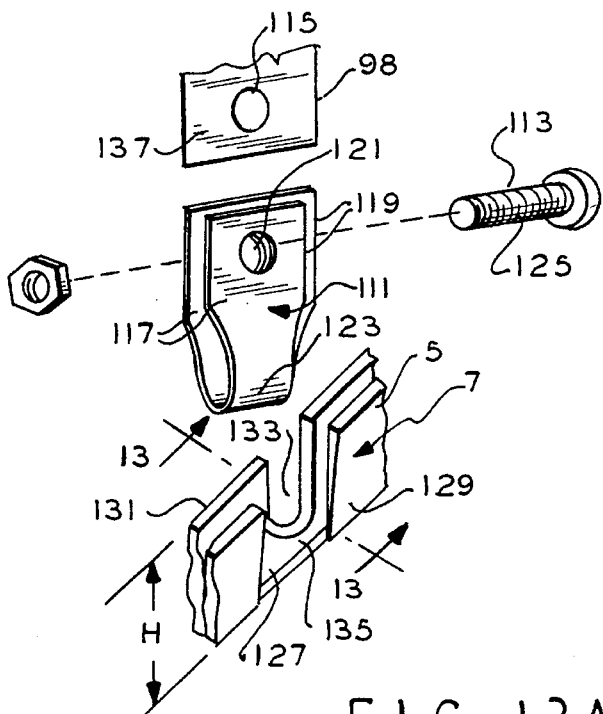
FIG. 12 is a simplified, exploded, view of the mounting arrangement of the steering wheel and air bag cover assemblies shown in FIG. 1.
Figure 14:
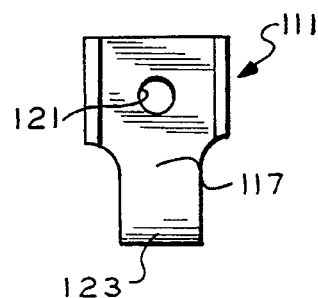
FIG. 14 is a right side view of the attachment clip of the mounting arrangement of FIG. 12.
Figure 13A:
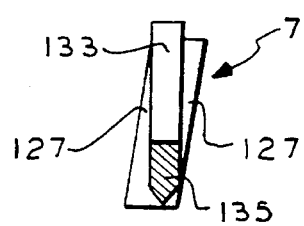
FIGS. 13A and 13B are sectional views of the right and left hand mounting portions respectively, of the boss along line 13—13.
Figure 13B:
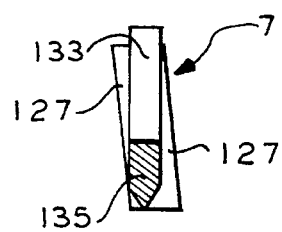

Referring to FIG. 1, a steering wheel 1, preferably made of magnesium metal having spokes 3 are shown affixed to a boss or boss means 5, which is in turn affixed to a fixed part of a vehicle, a hub of a steering wheel (not shown). An air bag cover 10 is attached to a base plate 30 which supports an air bag (not shown) on its upper end and is connected at its lower end to a mounting section 7 (discussed in detail, infra) of the boss 5.

Referring now to FIGS. 2–11, the air bag cover 10 comprises a lid portion 12, and mounting side wall portions or side walls 14, connected to said lid position 12. The mounting side wall portions 14 have outer and inner ends, 16 and 18, respectively, the outer ends of which are connected to the inner surface 20 of the lid portion 12. As is best shown in FIG. 6, the side walls 14 form a generally rectangular configuration in cross section. The mounting side wall portions 14 comprise, an upper member 22, a lower member 24, and a pair of lateral members 26 and 28. The inner ends 18 of the upper member 22 and the pair of lateral members 26 and 28 are connected to the base plate 30 (FIG. 11), which is mounted upon the mounting portion 7 of the boss 5. The base plate 30 accommodates an air bag (not shown) which is in a folded state between it and inner surface 20 of the lid portion 12 bounded by the side walls 14. More specifically, the upper member 22 and the lateral members 26 and 28, all include connecting means 32, 34 and 36, respectively, which connecting means (discussed in more detail infra), are adapted for connection to the base plate 30. The connecting means 34 and 36 of the lateral members 26 and 28, respectively, function or operate in such a manner that they detach (or are torn) from the base plate 30 when the air bag is deployed. However, the connecting means 32 of the upper member 22 functions or operates in such a manner that the upper member 22 remains attached to the base plate 30 when connecting means 34 and 36 of the lateral members 26 and 28, respectively, are detached or torn from the base plate 30 when the air bag deploys.

The lid portion 12 comprises, a top section 38, upper and lower sections, 40 and 42, respectively, and a pair of lateral sections 44 and 46. The upper and lower sections, 40 and 42, respectively, comprise upper and lower arcuate sections 48 and 50.

Referring now to FIGS. 4, 6 and 9 wherein the details of the upper member 22 are shown, it comprises an L-shaped bracket 52 (FIG. 9) and a downwardly disposed flange 54. A plurality of spaced apart webs 55 (FIG. 6) connect the bracket 52 to the inner surface 20 of the lid portion 12 at its upper section 40. The L-shaped bracket 52 itself comprises a downwardly disposed first flexible member 56 connected to the inner surface 20 of the upper section 40 of the lid portion 12 and a relatively rigid, inwardly extending, second member 58, with the flange 54 at its end. Referring now to FIG. 4, the second member 58 is shown laterally extending and having a plurality of apertures 60 extending there—through to the underside 62 (FIG. 9); those portions of the second member 58 which define the plurality of apertures 60 constitute the connecting means of the upper member 22. When conventional attaching means (i.e. bolts and nut) are inserted through these apertures 60 and corresponding apertures 63 in the base plate 30, they secure the upper member 22 thereto, and it remains attached to it even when the lateral members 26 and 28 are torn therefrom.

Referring now to FIG. 10, which illustrates, in an enlarged view, one (the left), of the two identical lateral members 26 and 28. The lateral member 26 is made of a flexible material and is in the form of a flat, elongated, rectangular member. Two, spaced apart, connecting means 34, are formed at the inner end 64 of the lateral member 26. Each of the connecting means 34 comprise weakened portions or portions of reduced thickness 66. These portions 6 form tearing portions 68 which open or tear when the air bag is deployed. An aperture 70 is formed in an outward section 72 in each of the portions of reduced thickness 66. The upper of the two portions of reduced thickness 66 is substantially trianularly shaped and generally forms a right triangle with a leading lower end 74 and a lagging upper end 76. The lower of the two portions of reduced thickness 66 is also substantially triangular shaped and generally forms an equilateral triangle with a leading lower edge 78 and a lagging upper end 80. The apex 82 of each triangularly shaped portion of reduced thickness 66 is disposed at or near the aperture 70 formed therein and the height of each portion of reduced thickness 66 increases inwardly.

Referring now to FIG. 11, which illustrates the base plate 30, it is preferably made of aluminum material. The base plate 30 comprises, a ring plate or first mounting portion 84 to which the air bag is conventionally affixed and mounting side wall portions or side walls 86 (only three of which are shown in said figure). The side walls 86 have outer and inner ends, 88 and 90, respectively. The side walls 86 comprise, an upper member 92, a lower member 94 and a pair of two-section lateral members 96 (only one of which is shown). Disposed between each of the two-section lateral members 96 are inwardly extending tabs or second mounting portions 98 connected to the mounting portion 7 of the boss 5. Each section of the two-section lateral members 96 has an aperture 100 formed therein. The mounting side walls 86 of the base plate 30 nests within their corresponding mounting side wall portion 14 of the lid portion 12. As previously discussed, the upper member 22 of the cover 10, is securely attached to the base plate 30 through its upper member 92; by conventional attaching means (i.e. bolts and nuts) which are inserted through apertures 70 in the lateral members 26 and 28 and through apertures 100 of the two-section lateral members 96, to loosely attach the lateral members to each other.

Figure 15:
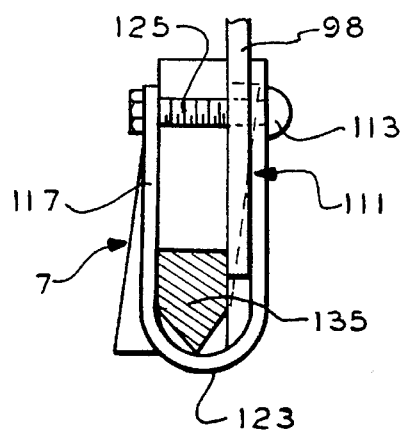
FIG. 15 is a simplified view, partly sectional, of the assembled mounting arrangement of FIG. 12.

Referring now to FIGS. 12–15, the mounting arrangement is illustrated in detail. This arrangement essentially comprises second mounting portions or tabs 98 of the base plate 30, attachment clips 111, fasteners 113, and mounting portions 7 of the boss 5. Each tab 98 has an aperture 115 formed in its lower end. The attachment clip 111 is generally U-shaped and comprises generally straight leg sections 117 having upper ends 119 through which upper ends an aperture 121 is formed, and a central section 123 connecting the leg sections 117 together. These attachment clips 111, two in number (but only one of which is shown), are each formed of steel material and are flexible but non-deformable. The apertures 115 through each of the pair of leg sections 117 receive the shank portion 125 of one of the two fasteners 113. The mounting portions 7 of the boss 5 are each disposed generally perpendicular to the base plate 30. Each of these mounting portions 7 have a slot 127 formed on the opposite sides thereof. These slots 127, taper in opposite direction; the mounting portion 7 on the right side of the boss 5 (FIG. 13A) has slot 127, on the outer side 129 of these mounting portions 7, tapering upwardly, and the slot 127, on the inner side 131 of these mounting portions 7, taper downwardly; the reverse is true on the left side (FIG. 13B). These slots 127, extend along substantially the entire height "H" of each of the mounting portions 7, and each of these mounting portions 7 have a channel 133 formed therein, which extends between the slots 127. Referring now specifically to FIG. 15, wherein the mounting arrangement is illustrated for the right side of the boss 5. The tab 98 of the base plate 30 is shown sandwiched between the outer slot 127 and the outer leg section 117 of the clip 111. The inner leg section 117, of the clip 111, engages the inner slot 127, and the fastener 113 is disposed through apertures 121 of the clip 111, the aperture 115 of the tab 98, and the channel 133 of the mounting portion 7 of the boss 5. The central section 123, of the clip 111, is dispose around the lower end 135. The mounting arrangement is assembled by inserting both tabs 98 of the base plate 30 in the outer slots 127 of the respective mounting portions 7, and then each of the clips 111 are forced upward, around the lower end 135 of the mounting portions 7 and the lower end 137 of the tab 98, thereby frictionally engaging the elements contacted until their apertures are aligned; the fastener 113 is then inserted through these apertures and tightened securely.

Accordingly, the pair of lateral members 26 and 28 are permitted to move a slight amount laterally. Those portions of the lateral members 26 and 28, which define the apertures 70 and the weakened portions or portions of reduced thickness 66, constitute the connecting means 34 and 36, respectively. As previously generally discussed, the connecting means 34 and 36 of the lateral members 26 and 28, respectively, function or operate in such a manner that they detach or are torn from the base plate 30 when the air bag is deployed. More specifically, when the air bag is deployed it presses against the inner surface 20 of the lid portion 12 forcing it outward. At the same time, the lateral members 26 and 28, attached to the lid portion 12, are forced outward resulting in the weakened portions 6.6 being torn attachment means inserted through their apertures 70 and the apertures 100 of the base plate 30 fixed to the boss 5. Since the upper member 22 of the cover 10 is securely attached and affixed to the upper member 92 of the base plate 30, it remains attached to the base plate 30 when the air bag is deployed. This results in the lateral members 26 and 28 being released, thereby pivoting the cover 10 outward and upward to allow the air bag to be fully deployed against the driver of the vehicle.

It is to be understood that various changes and modifications can be made in the invention without departing from the scope of the invention as defined by the appended claims.

What is claim is:

1. A mounting arrangement for a vehicle air bag comprising:

a boss means affixed to a component of a vehicle, spoke means extending from said boss means, a base plate having a first mounting portion on which an air bag is mounted and a second mounting portion on which said boss means is attached, a plurality of attachment clips, and a plurality of fasteners connecting said attachment clips to said second mounting portion of said base plate and said boss means, each of said attachment clips having generally straight, flexible leg sections and a central section connecting said leg sections together, each of said leg sections having an end portion, each of said end portions having an aperture therethrough for receiving a shank portion of one of said plurality of fasteners and for attaching together said second mounting portion and said boss means and wherein said boss means, said second mounting portion, and said attachment clips are formed of magnesium, aluminum and steel materials, respectively, said attachment clips spaced apart from said spoke means, boss mounting portion disposed generally perpendicular to said base plate, each boss mounting portion defining a channel and having slots formed in opposite sides thereof, each of said attachment clips frictionally engaging one of said slots formed in said boss mounting portion and one side of said second mounting portion for mounting said air bag, each said slot being tapered in opposite directions.

2. A mounting arrangement for a vehicle air bag comprising:

a boss means affixed to a component of a vehicle, a base plate having a first mounting portion on which an air bag is mounted and a second mounting portion to which said boss means is attached;

a plurality of attachment clips and a plurality of fasteners connecting said attachment clips to said second mounting portion and said boss means;

each attachment clip of said plurality of attachment clips having generally straight leg sections and a central section connecting said leg sections together, each leg section of said leg sections having an end portion with an aperture therethrough for receiving a fastener of said plurality of fasteners for coupling together said second mounting portion and said boss means, wherein said boss means, said second mounting portion and said attachment clips are formed of magnesium, aluminum and steel materials, respectively, and said boss means includes mounting portions which are disposed generally perpendicular to said base plate and each mounting portion of said mounting portions of said boss means has a slot formed on opposite sides of said mounting portion of said boss means and wherein each said slot is tapered, in opposite directions.

3. A mounting arrangement for a vehicle air bag comprising:

a boss means affixed to a component of a vehicle, a base plate having a first mounting portion on which an air bag is mounted and a second mounting portion to which said boss means is attached;

a plurality of attachment clips and a plurality of fasteners connecting said attachment clips to said second mounting portion and said boss means:

each attachment clip of said plurality of attachment clips having generally straight leg sections and a central section connecting said leg sections together, each leg section of said leg sections having an end portion with an aperture therethrough for receiving a fastener of said plurality of fasteners for coupling together said second mounting portion and said boss means, wherein said boss means, said second mounting portion and said attachment clips are formed of magnesium, aluminum and steel materials, respectively, and said boss means includes mounting portions which are disposed generally perpendicular to said base plate and each mounting portion of said mounting portions of said boss means has a slot formed on opposite sides of said mounting portion and wherein each said mounting portion has a channel formed therein and each said channel extends between said slots formed on said opposite sides of each said mounting portion.

4. A mounting arrangement as recited in claim 3, wherein each of said fasteners comprise a shank portion which extends through each aperture of said leg sections of each of said attachment clips.

* * * * *